United States Patent [19]
Dohmori et al.

[11] 3,714,170
[45] Jan. 30, 1973

[54] 2-SUBSTITUTED OR NON-SUBSTITUTED-NON-THIAZALO [5,4-F] QUINALINE-8-CARBOXYLATES COMPOUNDS AND THEIR METHOD OF PREPARATION

[75] Inventors: Renzo Dohmori; Shizuo Kadoya; Isao Takamura; Yasuo Oshima; Takeo Naito, all of Tokyo-to, Japan

[73] Assignee: Daiichi Seiyaku Co., Ltd., Tokyo-to, Japan

[22] Filed: Nov. 17, 1970

[21] Appl. No.: 90,479

[30] Foreign Application Priority Data

Nov. 17, 1969 Japan .............................. 44/91946

[52] U.S. Cl. ............ 260/283 S, 260/287 R, 260/304, 260/306, 424/258
[51] Int. Cl. .............................................. C07d 91/42
[58] Field of Search ........................ 260/287, 283 S

[56] References Cited

UNITED STATES PATENTS 3,287,458  11/1966  Kaminsky et al. ............... 260/287 R
3,506,667  4/1970  Kaminsky ........................ 260/287 R
3,515,745  6/1970  Tull ................................. 260/287 X

OTHER PUBLICATIONS

Landquist, Chem. Abstr. Vol. 68, Col. 2839h, (1968).

*Primary Examiner*—Donald G. Daus
*Attorney*—Sughrue, Rothwell, Mion, Zinn and Macpeak

[57] ABSTRACT

A compound represented by the formula:

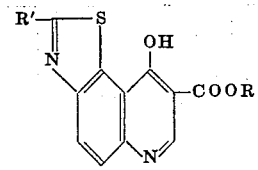

wherein R is a lower alkyl group, and R' is a member selected from the group consisting of a hydrogen atom, a halogen atom, a lower alkyl group, a lower alkoxy group, a lower alkylthio group and a sulfhydryl group.

9 Claims, No Drawings

2-SUBSTITUTED OR NON-SUBSTITUTED-NON-THIAZALO [5,4-F] QUINALINE-8-CARBOXYLATES COMPOUNDS AND THEIR METHOD OF PREPARATION

FIELD OF THE INVENTION

This invention relates to novel thiazoloquinoline derivatives and to a method for preparing said compounds.

DETAILED DESCRIPTION OF THE INVENTION

More particularly, the present invention is concerned with 2-substituted or non-substituted-9-hydroxy-thiazolo[5,4-f]quinoline-8-carboxylate derivatives represented by the following general Formula (I):

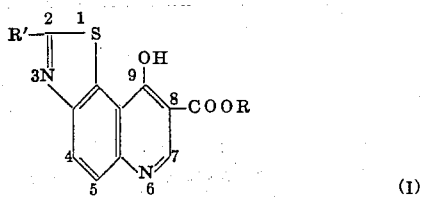

wherein R represents a lower alkyl group and R' represents a radical selected from the group consisting of a hydrogen atom, a halogen atom, a lower alkyl group, a lower alkoxy group, a lower alkylthio group, and a sulfhydryl group.

The novel compounds of the present invention have excellent antibacterial activity especially against Gram-positive bacteria. For instance, the anti-bacterial activity of ethyl 2-ethoxy-9-hydroxy-thiazolo[5,4-f]quinoline-8-carboxylate (A) was found to be more excellent than those of nalidixic acid (B) and sulfadimetoxine (C) which have been well known as representative synthetic antibiotics. The comparative test of these compounds was carried out with the Mueller Hinton medium under cultivation at 37°C for 48 hours. The test results expressed as minimal inhibitory concentration (MIC) are tabulated in the following Table I.

TABLE I

| Microorganism | Compound (A) | MIC ( g/ml) (B) | (C) |
|---|---|---|---|
| Staphylococcus pneumoniae (Resistant strain against various antibiotics) | 12.5 | 100 | 100 |
| Diplococcus pneumoniae DP-2 | 25 | 100 | 6.3 |
| Erysipelothirix phusiopathale; Chiran | 25 | 50 | 100 |
| Streptococcus G-36 | 25 | 100 | 6.3 |
| Corynebacterium diphtheriae PW-8 | 50 | 100 | 1.6 |

According to the present invention, the compounds of Formula (I) can be prepared by the cyclization of benzothiazole derivatives (II). The reaction scheme is as follows:

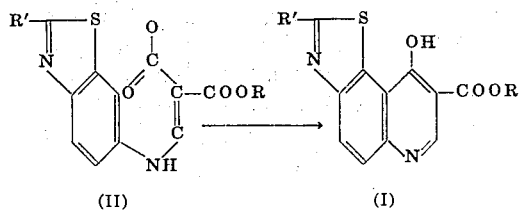

In above scheme R and R' have the same meaning as defined hereinabove. The cyclization reaction may be conducted by heating compound (II) at a temperature of between 150° and 300°C in a suitable solvent such as Dowtherm, diethyl phthalate, dodecyl benzene or any other inert solvent having a high boiling point. The cyclization is usually complete enough by heating from ten to several tens hours. The reaction time, however, varies to some extent depending upon the particular type of starting material (II).

The starting material (II) used in above reaction is also a novel compound, which can be readily synthesized from the corresponding dialkyl ethoxymethylene malonate and 6-amino-benzothiazole derivatives.

The present invention will be more fully explained by reference to the following non-limiting examples.

EXAMPLE 1

A mixture containing 9.6. g of 6-[bis(2,2-ethoxycarbonyl)-ethenyl-amino]benzothiazole and 70 ml of Dowtherm A was heated at a temperature of 250°–255 °C for about 15 minutes and allowed to cool. The solid that separated was collected and recrystallized from dimethylformamide. 6.28 g (77 percent) of ethyl-9-hydroxythiazolo[5,4]quinoline-8-carboxylate was obtained as colorless needles; m.p. >300°C.
Analysis Calculated for
$C_{13}H_{10}O_3N_2S$: C, 56.92; H, 3.68; N, 10.22
Found: C, 57.03; H, 3.65; N, 10.32

The intermediate 6-[bis(2,2-ethoxycarbonyl)ethenylamino]-benzothiazole was prepared as follows: A mixture of 12.0 g of 6-aminobenzothiazole and 19.0 g of diethyl ethoxymethylene-malonate in 70 ml of Dowtherm A was heated in an oil bath at a temperature of 120°C for 2 hours and allowed to cool. The solid that separated was collected and recrystallized from methanol to yield 18.0 g (70 percent) of 6-[bis(2,2-ethoxy-carbonyl)ethenylamino]benzothiazole as colorless needles; m.p. 117°–119°C.
Analysis Calculated for
$C_{15}H_{16}O_4N_2S$: C, 56.23; H, 5.04; N, 8.75
Found: C, 56.08; H, 4.92; N, 8.74

EXAMPLE 2

A mixture containing 5.05 g of 2-chloro-6-[bis(2,2ethoxycarbonyl) ethenylamino]benzothiazole and 50 ml of Dowtherm A was heated at temperatures of 235°–240°C for 10 minutes and at 240°–250°C for 30 minutes and then allowed to cool. The solid that separated was collected and recrystallized from dimethylformamide to give 4.01 g (86 percent) of ethyl 2-chloro-9-hydroxythiazole[5,4-f]quinoline-8-carboxylate as a yellow powder; m.p. 300°C.
Analysis Calculated for
$C_{13}H_9O_3N_2SCl$: C, 50.57; H, 2.94; N, 9.08
Found: C, 50.86; H, 2.95; N, 9.37

The intermediate 2-chloro-6-[bis(2,2-ethoxycarbonyl)-ethenyl-amino]benzothiazole was prepared as follows: A mixture of 18.5 g of 6-amino-2-chlorobenzothiazole and 21.6 g of diethyl ethoxymethylenemalonate in 37 ml of dimethylformamide was heated at temperatures of 95°–100°C for 1 hour and allowed to cool. Methanol was added to the reaction mixture and the solid that separated was collected. Recrystallization from methanol gave 27.5 g (78 percent) of 2-chloro-6-[bis(2,2-ethoxycarbonyl)ethenylamino]benzothiazole as colorless needles; m.p. 160°–162°C.
Analysis Calculated for
$C_{15}H_{15}O_4N_2SCl$: C, 50.77; H, 4.26; N, 7.90
Found: C, 51.03; H, 4.20; N, 8.17

EXAMPLE 3

Eighty milliliters of Dowtherm A was heated to reflux and to it was added 10.0 g of 2-methyl-6-[bis(2,2-ethoxycarbonyl)ethenylamino]benzothiazole dissolved in 20 ml of warm Dowtherm A. The reaction mixture was then heated at temperatures of 250°–255 °C for 10 minutes and allowed to cool. The solid that separated was collected and recrystallized from dimethyl-formamide to yield, as colorless powder, 5.25 g (61 percent) of ethyl-9-hydroxy-2-methylthiazolo[5,4-f]quinoline-8-carboxylate, m.p. 293°C (decomp.).
Analysis Calculated for
$C_{14}H_{10}O_3N_2S \cdot 1/4H_2O$: C, 57.42; H, 3.61; N, 9.57
Found: C, 57.47; H, 3.90; N, 9.87

The intermediate 2-methyl-6-[bis(2,2-ethoxycarbonyl)ethenylamino]benzothiazole was prepared as follows: A mixture of 9.89 g of 6-amino-2-methylbenzothiazole and 12.96 g of diethyl ethoxymethylenemalonate in 60 ml of Dowtherm A was heated at temperatures of 100°–120°C for 5 hours and allowed to cool. The crystals that separated was collected and recrystallized from acetone to yield 2-methyl-6-[bis(2,2-ethoxycarbonyl)ethenylamino]benzothiazole as a yellow powder; 13.4 g (67 percent), m.p. 139°–141°C.
Analysis Calculated for
$C_{16}H_{18}O_4N_2S$: C, 57.47; H, 5.42; N, 8.38
Found: C, 57.76; H, 5.68; N, 8.55

EXAMPLE 4

A mixture containing 1.92 g of 2-ethoxy-6-[bis(2,2-ethoxycarbonyl)-ethenylamino]benzothiazole and 19 ml of Dowtherm A was refluxed for 15 minutes and allowed to cool. The solid that separated was collected and recrystallized from dimethylformamide to yield 1.45 g (86 percent) of ethyl-2-ethoxy-9-hydroxythiazolo[5,4-f]quinoline-8-carboxylate as colorless needles melting above 300°C.
Analysis Calculated for
$C_{15}H_{14}O_4N_2S$: C, 56.59; H, 4.43; N, 8.80
Found: C, 56.43; H, 4.21; N, 8.96

The intermediate 2-ethoxy-6-[bis(2,2-ethoxycarbonyl)-ethenylamino]benzothiazole was prepared as follows: A mixture of 1.95 g of 6-amino-2-ethoxybenzothiazole and 2.16 g of diethyl ethoxymethylenemalonate in 4 ml of dimethylformamide was heated at a temperature of 95°C for 1 hour and allowed to cool. Ethanol was added to the mixture and the solid that separated as collected. Recrystallization from ethanol gave 2.41 g (66 percent) of 2-ethoxy-6-[bis(2,2-ethoxycarbonyl)ethenylamino]benzothiazole melting at 115°–116°C as colorless needles.
Analysis Calculated for
$C_{17}H_{20}O_5N_2S$: C, 56.03; H, 5.53; N, 7.69
Found: C, 56.30; H, 5.25; N, 7.65

EXAMPLE 5

A mixture containing 5.0 g of 2-methylthio-6-[bis(2,2-ethoxy-carbonyl)ethenylamino]benzothiazole and 50 ml of Dowtherm A was heated at temperatures of 240°–245°C for 22 minutes and allowed to cool. Acetone was added to the mixture and the solid that separated was collected and recrystallized from dimethyl sulfoxide. There was thus obtained ethyl-9-hydroxy-2-methylthiothiazolo[5,4-f]quinoline-8-carboxylate, melting above 300°C, as pale yellow needles, 3.68 g (84 percent).
Analysis Calculated for
$C_{14}H_{12}O_3N_2S_2$: C, 52.48; H, 3.78; N, 8.75
Found: C, 52.19; H, 3.67; N, 8.94

The intermediate 2-methylthio-6-[bis(2,2-ethoxycarbonyl)-ethenyl-amino]benzothiazole was prepared as follows: A mixture of 15.0 g of 6-amino-2-methylthiobenzothiazole and 16.6 g of diethyl ethoxymethylenemalonate in 75 ml of Dowtherm A was heated at temperatures of 105°–110°C for 2 hours and allowed to cool. The solid that separated was recrystallized from acetone to give 21.8 g (85 percent) of 2-methylthio-6-[bis(2,2-ethoxycarbonyl)ethenylamino]benzothiazole melting at 132°–134°C as colorless needles.
Analysis Calculated for
$C_{16}H_{18}O_4N_2S_2$: C, 52.44; H, 4.95; N, 7.65
Found: C, 52.45; H, 5.08; N, 7.80

EXAMPLE 6

A mixture of 5.0 g of 2-mercapto-6-[bis(2,2-ethoxycarbonyl) ethenylamino]benzothiazole in 50 ml of Dowtherm A was heated at temperatures of 220°–240 °C for 40 minutes and allowed to cool. The solid that separated was collected and recrystallized from dimethylformamide to yield 2.50 g (58 percent) of ethyl-9-hydroxy-2-mercaptothiazolo[5,4-f]quinoline-8-carboxylate melting above 300°C as a yellow powder.
Analysis Calculated for
$C_{13}H_{10}O_3N_2S_2$: C, 50.95; H, 3.29; N, 9.15
Found: C, 50.67; H, 3.58; N, 9.42

The intermediate 2-mercapto-6-[bis(2,2-ethoxycarbonyl)-ethenylamino]benzothiazole was prepared as follows: A mixture of 17.8 g of 6-amino-2-mercaptobenzothiazole and 21.6 g of diethyl ethoxymethylenemalonate in 90 ml of Dowtherm A was heated at temperatures of 120°–130°C for 1½ hours and recrystallized from dimethylformamide to give 27.9 g (81 percent) of 2-mercapto-6-[bis(2,2-ethoxycarbonyl)ethenylamino]-benzothiazole, melting at 255°–256°C (decomp.), as a pale yellow powder.
Analysis Calculated for
$C_{15}H_{16}O_4N_2S_2$: C, 51.12; H, 4.58; N, 7.95
Found: C, 50.83; H, 4.70; N, 8.11

What is Claimed is:

1. A compound represented by the formula:

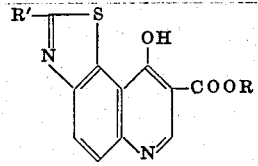

wherein R is a lower alkyl group, and R' is a member selected from the group consisting of a hydrogen atom, a halogen atom, a lower alkyl group, a lower alkoxy group, a lower alkylthio group and a sulfhydryl group.

2. The compound of claim 1 which is ethyl-9-hydroxythiazolo-[5,4-f]-quinoline-8-carboxylate.

3. The compound of claim 1 which is ethyl-2-chloro-9-hydroxythiazole-[5,4-f]-quinoline-8-carboxylate.

4. The compound of claim 1 which is ethyl-9-hydroxy-2-methylthiazolo-[5,4-f]-quinoline-8-carboxylate.

5. The compound of claim 1 which is ethyl-2-ethoxy-9-hydroxythiazolo-[5,4-f]-quinoline-8-carboxylate.

6. The compound of claim 1, which is ethyl-9-hydroxy-2-mercaptothiazolo-[5,4-f]-quinoline-8-carboxylate.

7. A process for preparing thiazolo[5,4-f]quinoline compounds represented by the formula:

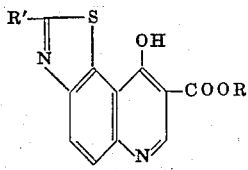

wherein R is a lower alkyl group and R' is a member selected from the group consisting of a hydrogen atom, a halogen atom, a lower alkyl group, a lower alkoxy group, a lower alkylthio group and a sulfhydryl group, which comprises heating a benzothiazole compound represented by the following formula:

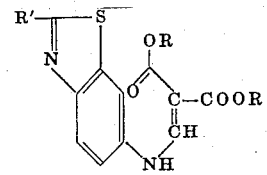

wherein R and R have the same meaning as defined above, in an inert solvent for a period of time and at a temperature sufficient to cyclize said benzothiazole compound.

8. The process of claim 7 wherein the temperature varies from 150° to 300°C.

9. The process of claim 7 wherein said inert solvent is Dowtherm, diethyl phthalate or dodecyl benzene.

* * * * *